United States Patent
Mitsuya

(10) Patent No.: US 7,983,454 B2
(45) Date of Patent: Jul. 19, 2011

(54) IMAGE PROCESSING APPARATUS AND IMAGE PROCESSING METHOD FOR PROCESSING A FLESH-COLORED AREA

(75) Inventor: Kota Mitsuya, Kodama-gun (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 12 days.

(21) Appl. No.: 12/555,586

(22) Filed: Sep. 8, 2009

(65) Prior Publication Data

US 2010/0158403 A1 Jun. 24, 2010

(30) Foreign Application Priority Data

Dec. 24, 2008 (JP) ................................. 2008-328077

(51) Int. Cl.
*G06K 9/46* (2006.01)
(52) U.S. Cl. .......................... 382/118; 382/261; 382/299
(58) Field of Classification Search ........................ None
See application file for complete search history.

(56) References Cited

U.S. PATENT DOCUMENTS

| 5,552,894 | A | 9/1996 | Aiba |
| 5,696,848 | A | 12/1997 | Patti et al. |
| 6,873,436 | B1 | 3/2005 | Terada et al. |
| 7,315,630 | B2 * | 1/2008 | Steinberg et al. ............. 382/118 |
| 2004/0114825 | A1 * | 6/2004 | Wu ................................. 382/261 |
| 2006/0256217 | A1 | 11/2006 | Hatano |
| 2006/0274936 | A1 * | 12/2006 | Ohkubo et al. ............... 382/167 |
| 2007/0115371 | A1 * | 5/2007 | Enomoto et al. ........... 348/222.1 |
| 2010/0111418 | A1 | 5/2010 | Okutomi et al. |

FOREIGN PATENT DOCUMENTS

| JP | 08-263639 | 10/1996 |
| JP | 11-205594 | 7/1999 |
| JP | 2005-094452 | 4/2005 |
| JP | 2006-011619 | 1/2006 |
| JP | 2006-019930 | 1/2006 |
| JP | 2006-025037 | 1/2006 |
| JP | 2007-133810 | 5/2007 |
| JP | 4035254 | 11/2007 |
| JP | 2008-067110 | 3/2008 |
| JP | 2008-097657 | 4/2008 |
| JP | 2008-146190 | 6/2008 |
| JP | 2008-234130 | 10/2008 |
| JP | 2008-278467 | 11/2008 |

* cited by examiner

*Primary Examiner* — Brian P Werner
(74) *Attorney, Agent, or Firm* — Blakely Sokoloff Taylor & Zafman, LLP

(57) ABSTRACT

According to one embodiment, an image processing apparatus includes a detection module configured to detect a specific color area included in image data, an image processing control module configured to generate an image processing control signal for controlling an image process for the specific color area among image processes including a sharpening process for the image data, and an image processing module configured to subject the image data to the image process on the basis of the image processing control signal.

7 Claims, 3 Drawing Sheets

US 7,983,454 B2

IMAGE PROCESSING APPARATUS AND IMAGE PROCESSING METHOD FOR PROCESSING A FLESH-COLORED AREA

CROSS-REFERENCE TO RELATED APPLICATIONS

This application is based upon and claims the benefit of priority from Japanese Patent Application No. 2008-328077, filed Dec. 24, 2008, the entire contents of which are incorporated herein by reference.

BACKGROUND

1. Field

One embodiment of the invention relates to an image processing apparatus and an image processing method which carry out the process of sharpening images.

2. Description of the Related Art

Recently, opportunities to view video content on a personal computer display whose resolution exceeds that specified in the Standard-Definition (SD) standard have been increasing. As high-definition broadcasting has been getting into full swing, a High-Definition (HD) standard-compatible television receivers have been becoming popular in ordinary households.

Compared with such a high-resolution video display unit, video data obtained by an image pickup apparatus, such as a video camera, television broadcast complying with the SD standard, and DVDs are low in resolution. Therefore, it is necessary to increase the resolution of video data using suitable means. In addition, when an image is partially enlarged and displayed or when filming is performed by digital zoom exceeding optical zoom with a video camera, the resolution has to be increased.

To increase resolution, linear interpolation or interpolation by cubic convolution has been used. However, this has caused the problem of being incapable of obtaining sufficient sharpness. Jpn. Pat. Appln. KOKAI Publication No. 2008-067110 and Jpn. Pat. Appln. KOKAI Publication No. 2008-146190 have disclosed super-resolution techniques for creating an image exceeding the original image in resolution by creating new pixel value data between pixels, generating a high-frequency component, and sharpening the original image. In addition, the technique for incorporating a super-resolution function into a video input-output apparatus as described above is being developed.

However, when the process including such a sharpening technique (e.g., the aforementioned super-resolution technique) has been realized in an actual digital television, it has been found that the image processing might have an adverse effect, depending on the type of images.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not limit the scope of the invention.

DETAILED DESCRIPTION

Figure 1:
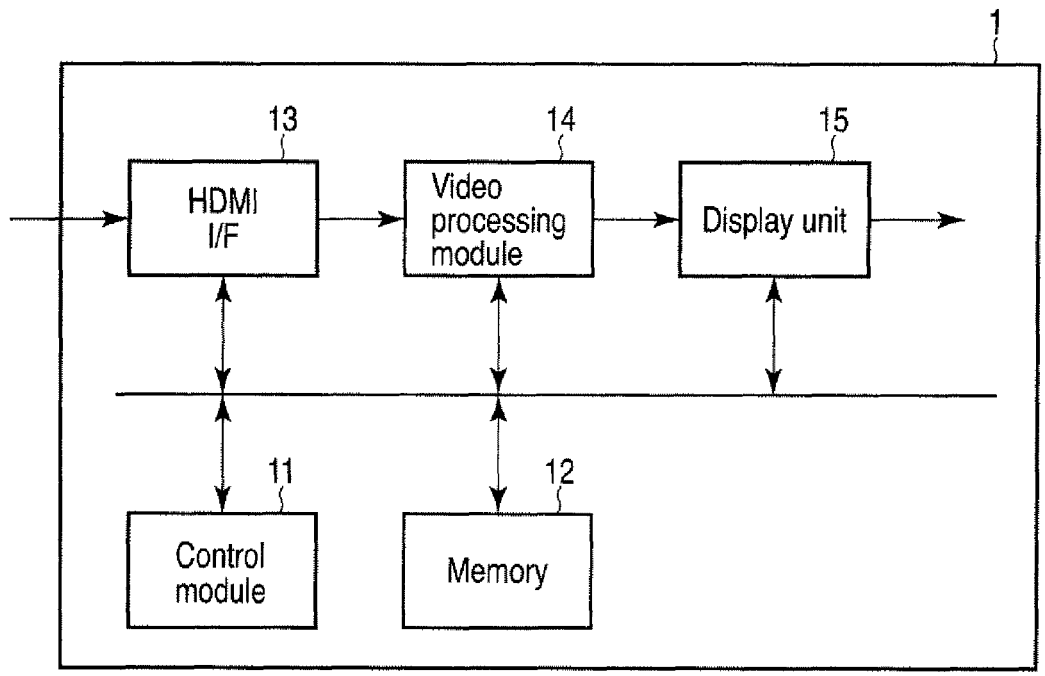
FIG. 1 is a block diagram showing the configuration of a video processing apparatus according to an embodiment of the invention.

Various embodiments according to the invention will be described hereinafter with reference to the accompanying drawings. In general, an image processing apparatus according to one embodiment of the embodiment comprises a detection module configured to detect a specific color area included in image data, an image processing control module configured to generate an image processing control signal for controlling an image manipulation process for the specific color area among image manipulation processes including a sharpening process for the image data, and an image processing module configured to subject the image data to the image manipulation process on the basis of the image processing control signal.

Hereinafter, referring to the accompanying drawings, an embodiment of the invention will be explained.

First, referring to FIG. 1, the configuration of a video processing apparatus 1 (or an image processing apparatus) according to an embodiment of the invention will be explained. The video processing apparatus 1 is, for example, a video reproducer, such as a DVD player, or a video display unit, such as a set-top box or a digital TV set. The video processing apparatus 1 can be connected to another video processing unit via an interface complying with a specific communication standard, for example, the High-Definition Multimedia Interface (HDMI) standard (hereinafter, referred to as an HDMI interface). The video processing apparatus 1 can transmit and receive a video signal via the HDMI interface of another video processing unit. The HDMI standard has further determined the Consumer Electronics Control (CEC) standard. Accordingly, the video processing apparatus 1 can transmit and receive control information and the like conforming to the CEC standard via the HDMI interface of another video processing unit.

Furthermore, the video processing apparatus 1 can subject a video signal (image data) to an image manipulation process including a sharpening process. The video processing apparatus 1 can moderate or disable the sharpening process on a specific color area (or face image area) included in the video signal. For example, when the sharpening process is applied uniformly to the entire image, an image, such as a landscape, becomes sharper, with the result that the user can feel an improvement in the picture quality. However, if an image, such as a person's face, becomes too sharp, the user may feel the image unnatural. To prevent such an unnatural image from being output, a method of lowering the level of the sharpening process on the entire image can be considered. With this method, however, the degree of sharpness of an image, such as a landscape, supposed to be displayed more sharply is decreased. To overcome this problem, the video processing apparatus 1 moderates the sharpening process for a specific color area (face image area) included in the video signal, thereby outputting an image, such as a landscape, more sharply, which enables an image, such as a person's face, to be output more naturally. Control of the sharpening process by the video processing apparatus 1 will be explained in detail later.

Figure 2:
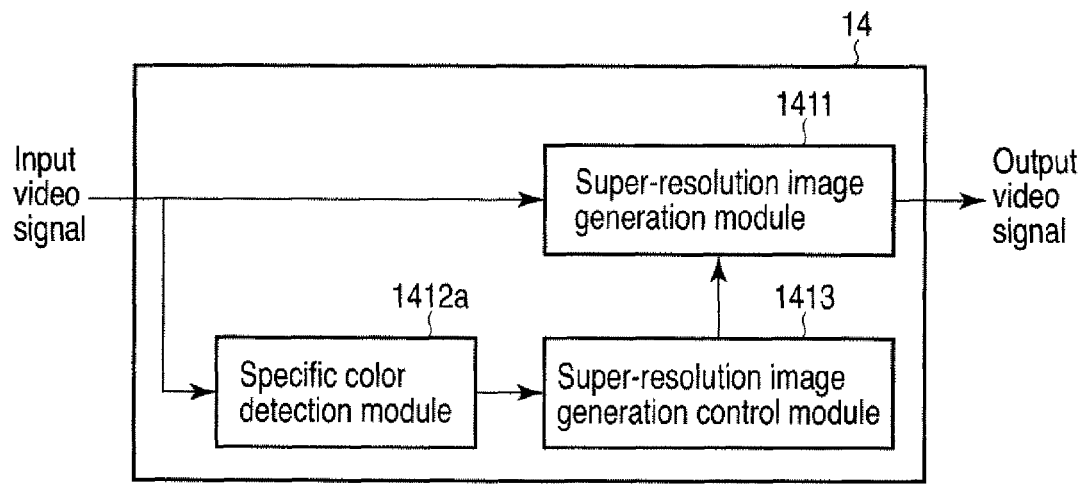
FIG. 2 is a block diagram to realize specific color detection and super-resolution process control according to the embodiment.

As shown in FIG. 1, the video processing apparatus 1 comprises a control module 11, a memory 12, an HDMI interface 13, a video processing module 14, and a display unit 15. As shown in FIG. 2, the video processing module 14 includes a super-resolution image generation module 1411, a specific color detection module 1412a, and a super-resolution image generation control module 1413.

The control module 11 controls the operation of each part of the digital TV set 1. The memory 12 stores various pieces of setting information and control information. For example, the memory 12 stores various parameters for generating super-resolution images.

The HDMI interface 13, which connects with an HDMI interface provided in another video processing unit, transmits and receives a video signal and a control signal conforming to the HDMI standard. The video processing module 14 subjects an input video signal from another video processing unit to various image manipulation processes via the HDMI interface 13 and outputs the result to the display unit 15. For example, as shown in FIG. 2, the super-resolution image generation module 1411 of the video processing module 14 subjects the input video signal to a super-resolution process and outputs the resulting video signal to the display unit 15. The display unit 15 displays on the screen the images based on the video signal subjected to the super-resolution process.

The super-resolution image generation module 1411 increases pixels by estimating the original pixel value from an image signal at a low resolution, a first resolution, thereby carrying out a sharpening process of restoring an image signal at a high resolution, a second resolution. Here, "the original pixel value" is the value of each pixel of the image signal obtained by photographing the same subject with the high-resolution (second-resolution) camera as when the low-resolution (first-resolution) image signal was obtained. In addition, "increase pixels by estimating" means to grasp the characteristic of a target image, estimate the original pixel value from high-correlation images in the same frame or between frames, and set the estimated value as a pixel value caused to correspond to a new pixel. That is, the correlation between images is used.

More specifically, first, a temporary full HD high-resolution image is created from the original input video by an upconversion process. That is, on the basis of information on adjacent pixels, intervening pixels are interpolated, thereby creating a temporary full HD high-resolution image. The interpolated pixels do not necessarily exist in the original image from the beginning. That is, noise or edge distortion may occur due to calculation errors.

Next, on the basis of an imaging model function, an image is created by downconverting the resolution of the temporary full HD high-resolution image to the same resolution as that of the original image. The imaging model function is for mathematically duplicating the same process as converting information on the image pickup device of an ordinary camera.

Although the downconverted image ought to be the same as the input image, there is a difference in part between the downconverted image and the original input image due to calculation errors in the upconversion process. The different part is detected and corrected so as to prevent calculation errors from occurring with reference to information on the surrounding pixels, thereby creating an output image which has been subjected to a super-resolution process and is close to the original input image.

That is, the super-resolution process is related to the technique for comparing the downconverted image with the original input image and restoring a signal which the original input image is supposed to have. As the comparison and restoration processes are repeated further, the accuracy of the super-resolution process increases. Accordingly, the process of performing comparison and restoration only once is a super-resolution process and the process of performing comparison and restoration a plurality of times is also a super-resolution process. When there is enough time, for example, when the user watches the recorded images later, a super-resolution process where comparison and restoration processes are repeated a plurality of times can be used.

The super-resolution image generation module 1411 may use the publicly known and used techniques disclosed in, for example, Jpn. Pat. Appln. KOKAI Publication No. 2007-310837, Jpn. Pat. Appln. KOKAI Publication No. 2008-98803, and Jpn. Pat. Appln. KOKAI Publication No. 2000-188680. As the technique of the super-resolution image generation module 1411 of the embodiment, for example, the technique for restoring an image whose frequency component is higher than a Nyquist frequency determined by the sampling period of the input image can be used.

For example, when the super-resolution process disclosed in Jpn. Pat. Appln. KOKAI Publication No. 2007-310837 is used, a plurality of corresponding points corresponding to a plurality of target image areas closest to a pixel value change pattern in the target image areas including the target pixels in each of a plurality of medium-resolution frames are selected from a reference frame. The sampled values of luminance at the corresponding points are set as the pixel values of the target pixels corresponding to the corresponding points. On the basis of the magnitudes of a plurality of sampled values and the locations of a plurality of corresponding points, the pixel value of a high-resolution frame which has a larger number of pixels than the reference frame and corresponds to the reference frame is calculated. Then, the original pixel value is estimated from a low-resolution image signal to increase pixels, thereby restoring a high-resolution image signal.

When a self-search of congruence locations in the same frame image disclosed in Jpn. Pat. Appln. KOKAI Publication No. 2008-98803 is used, errors in the individual pixels in a search area of a medium-resolution frame are compared, thereby calculating a first pixel position where the error becomes the smallest. On the basis of the first pixel position, the first error, and a second pixel position in the vicinity of the first pixel and a second error, a position where an error becomes the smallest in the search area is calculated with a decimal precision to the first decimal place. Then, a decimal precision vector which has the calculated position as the ending point and a target pixel as the starting point is calculated. Using the decimal precision vector, an extrapolation vector for a decimal precision vector which has a pixel not included in the search area as the ending point is calculated. Then, on the basis of the decimal precision vector, extrapolation vector, and the pixel value obtained from the image signal, the pixel value of a high-resolution image whose number of pixels is larger than the number of pixels included in the image signal. Carrying out the above processes, the super-resolution image generation module 1411 estimates the original pixel value from a low-resolution image signal to increase pixels, thereby restoring a high-resolution image signal.

In addition, a super-resolution process using mapping between a plurality of frame images disclosed in Jpn. Pat. Appln. KOKAI Publication No. 2000-188680.

Furthermore, in the super-resolution process at the super-resolution image generation module 1411 of the embodiment, a unique algorithm may be applied to the enlarged image, thereby converting the image into a low-resolution image temporarily. The image may further compared with the original input image, detecting the difference between them. Then, the image may be subjected to a correction process, thereby carrying out a high-quality image manipulation process.

The super-resolution process at the super-resolution image generation module 1411 is not limited to the above method and may be applied to various methods, such as a method of restoring a high-resolution image signal by estimating the original pixel value from a low-resolution image signal to increase pixels.

Figure 6:
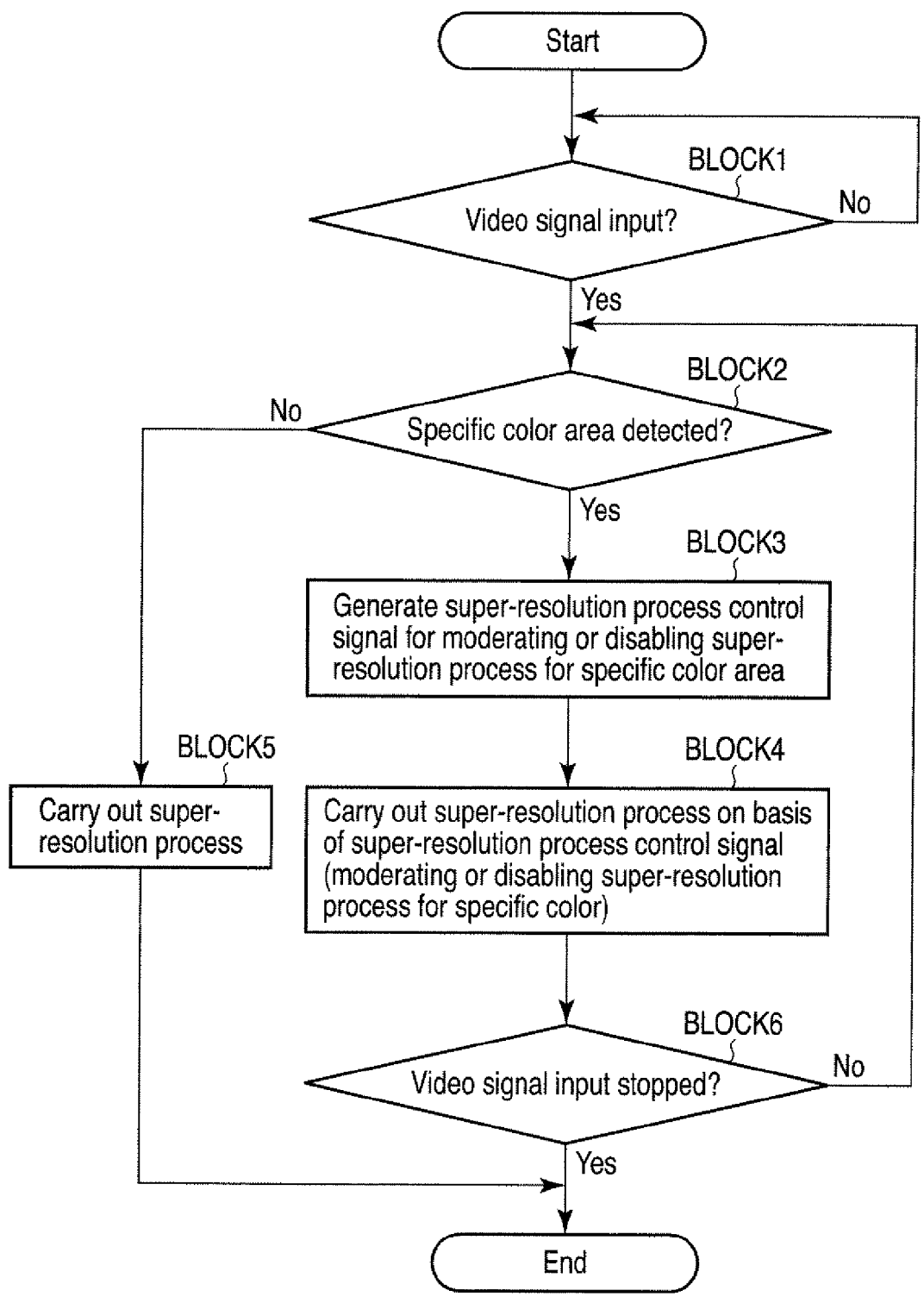
FIG. 6 is a flowchart to explain the control of a super-resolution process for a specific color area according to the embodiment.

Next, an example of super-resolution process control will be explained with reference to a block diagram shown in FIG. 2 and a flowchart shown in FIG. 6. As shown in FIG. 2, the video processing module 14 is so configured that an input video signal from the outside (or another video processing unit) is input to the super-resolution image generation module 1411 and specific color detection module 1412a.

When the input video signal is input to the super-resolution image generation module 1411 and specific color detection module 1412a (YES in BLOCK 1), the specific color detection module 1412a detects a specific color included in the input video signal, for example, detects an area not smaller than a specific size and including the specific color at not less than a specific rate as a specific color area (BLOCK 2). As a more concrete example, the specific color detection module 1412a detects a flesh color included in the input video signal and detects an area not smaller than a specific size and including the flesh color at not less than a specific rate as a specific color area. In other words, the specific color detection module 1412a detects a person's face image area.

When the specific color area has been detected (YES in BLOCK 2), the specific color detection module 1412a informs the super-resolution image generation control module 1413 of the result of detecting the specific color area (e.g., position information on the specific color area). On the basis of the result of detecting the specific color area, the super-resolution image generation control module 1413 generates a super-resolution control signal for a super-resolution process for the specific color area (BLOCK 3). For example, on the basis of the result of detecting the specific color area, the super-resolution image generation control module 1413 generates a super-resolution control signal to moderate or disable the super-resolution process for the specific color area.

The super-resolution image generation control module 1413 informs super-resolution image generation module 1411 of the super-resolution control signal. On the basis of the super-resolution control signal, the super-resolution image generation module 1411 subjects the input video signal to a super-resolution process (BLOCK 4). That is, on the basis of the super-resolution control signal, the super-resolution image generation module 1411 moderates or disables the super-resolution process for the specific color area, while subjecting the area excluding the specific color area to the super-resolution process without moderating the process (BLOCK 4).

For example, the video processing apparatus 1 can accept the level setting of the super-resolution process by the user. In this case, the super-resolution image generation module 1411 sets the level of the super-resolution process for the specific color area lower than the set level, disables the super-resolution process for the specific color area, or applies a preset-level super-resolution process to the area excluding the specific color area. Setting the level of the super-resolution process for the specific color area lower than the set level is setting a parameter for the super-resolution process to the extent that the video signal is not adversely affected.

Disabling the super-resolution process for the specific color area may be preventing the video signal of the specific color area from passing through the super-resolution image generation module 1411 (a hardware through process) or allowing the video signal of the specific color area to pass through the super-resolution image generation module 1411 and setting a parameter for a super-resolution process for the video signal of the specific color area at a value that makes it impossible to obtain a super-resolution process effect (a software through process). In the case of the hardware through process, the video signal of the specific color area is prevented from passing through the super-resolution image generation module 1411 and the video signals of the area excluding the specific color area are allowed to pass through the super-resolution image generation module 1411. The video processing module 14 combines the video signal of the specific color area not passed through the super-resolution image generation module 1411 with the video signals of the area excluding the specific color area passed through the super-resolution image generation module 1411 and outputs the resulting signal.

That is, disabling the super-resolution process for the specific color area is realized by either preventing the video signal of the specific color area from being input to the super-resolution image generation module 1411 or inputting the video signal to the super-resolution image generation module 1411 and setting a parameter for a super-resolution process for the video signal of the specific color area at a value that makes it impossible or difficult to obtain a super-resolution process effect (e.g., setting the sharpening gain to zero without increasing the gain or not carrying out a restoration process).

If the specific color area has not been detected (NO in BLOCK 2), the super-resolution image generation module 1411 subjects the input video signal (entire image) to the super-resolution process (BLOCK 5). If the input video signal is input neither to the super-resolution image generation module 1411 nor to the specific color detection module 1412a (YES in BLOCK 6), the process is terminated.

In recent years, a full HD flat-panel image display unit with 1920×1080 pixels has been widely used, making it possible to faithfully display images of full HD content at full HD resolution. There has been an increasing demand toward beautifully displaying even terrestrial digital broadcasts or SD content, such as DVD software, whose resolution is lower than full HD resolution. According to the demand, the video display unit can convert SD content into images as sharp as full HD content by the super-resolution process and display the resulting images. In the super-resolution process, however, an image not necessarily needing sharpening, such as a person's face, is also processed into a sharp image. Consequently, the unevenness of or wrinkles on the image of a person's face may be emphasized.

The above-described video processing apparatus 1 can overcome such a problem. Specifically, the video processing apparatus 1 controls (or suppresses) the super-resolution image generation process for an arbitrary color part, thereby enabling an image of a person's face or the like to be displayed naturally without emphasizing the unevenness of or wrinkles on the image of a person's face or the like and further enabling the image excluding the person's face to be displayed sharply.

Figure 3:
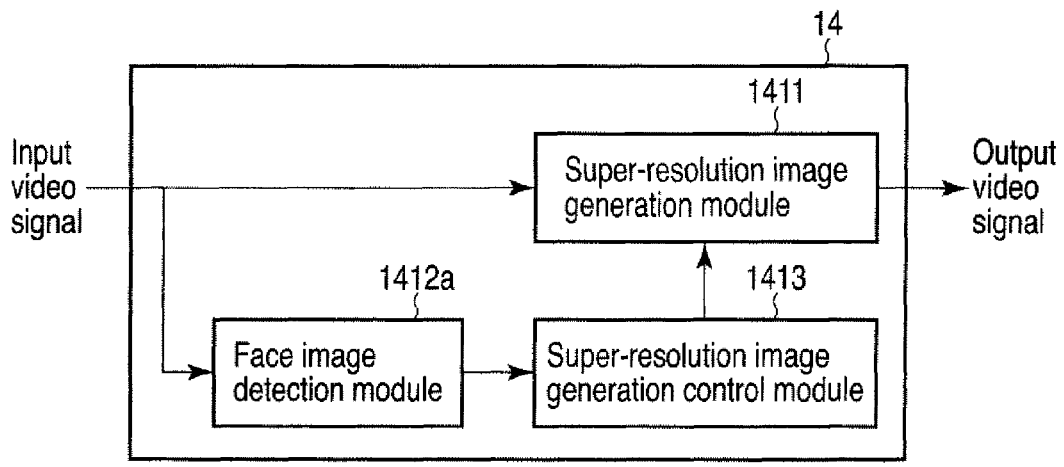
FIG. 3 is a block diagram to realize face image detection and super-resolution process control according to the embodiment.

Next, another example of super-resolution process control will be explained with reference to FIG. 3. The video processing module 14 may be configured as shown in FIG. 3. The video processing module 14 includes a super-resolution image generation module 1411, a face image detection module 1412b, and a super-resolution image generation control module 1413. The video processing module 14 is so configured that an input video signal from the outside (or another video processing unit) is input to the super-resolution image generation module 1411 and face image detection module 1412b.

When the input video signal has been input to the super-resolution image generation module 1411 and face image detection module 1412b, the face image detection module 1412b detects a face image area included in the input video signal. Face detection techniques used in digital cameras and the like may be used to detect the face image area. When the face image area has been detected, the face image detection module 1412b informs the super-resolution image generation control module 1413 of the result of detecting the face image area (e.g., position information on the face image area). On the basis of the result of detecting the face image area, the super-resolution image generation control module 1413 generates a super-resolution control signal for moderating or disabling the super-resolution process for the face image area.

The super-resolution image generation control module 1413 informs the super-resolution image generation module 1411 of the super-resolution control signal. On the basis of the super-resolution control signal, the super-resolution image generation module 1411 moderates or disables the super-resolution process for the image face area, while subjecting the area excluding the face image area to the super-resolution process without moderating the process.

Although control of the super-resolution process for the specific color area (or face image area) has been explained, an image manipulation process other than the super-resolution process may be controlled. For example, a sharpening process for the specific color area (or face image area) may be controlled. The sharpening process is the process of emphasizing the edge of an image included in the image data. The same details as already explained will be omitted or explained simply.

Figure 4:
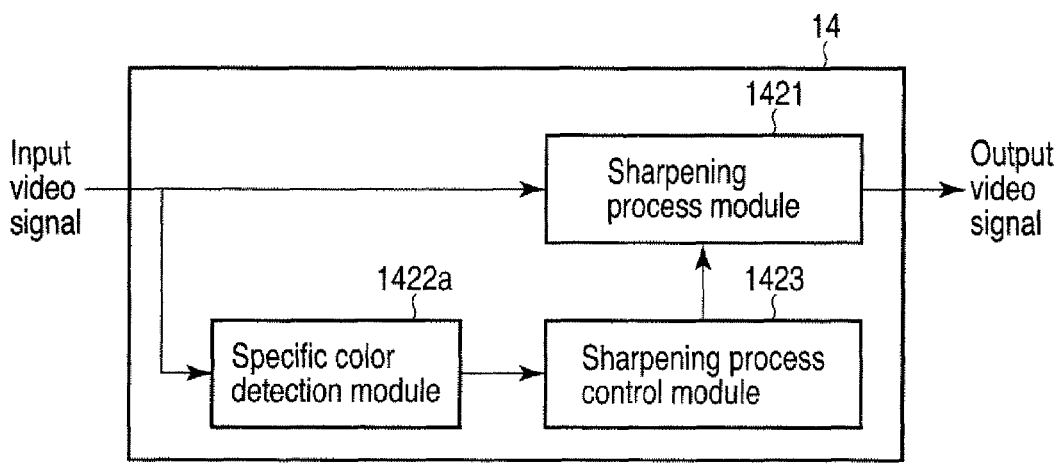
FIG. 4 is a block diagram to realize specific color detection and sharpening process control according to the embodiment.

Referring to FIG. 4, an example of sharpening process control will be explained. The video processing module 14 may be configured as shown in FIG. 4. Specifically, the video processing module 14 includes a sharpening process module 1421, a specific color detection module 1422a, and a sharpening process control module 1423. The video processing module 14 is so configured that an input video signal from the outside (or another video processing unit) is input to the sharpening process module 1421 and specific color detection module 1422a.

When the input video signal has been input to the sharpening process module 1421 and specific color detection module 1422a, the specific color detection module 1422a detects the specific color area included in the input video signal. When the specific color area has been detected, the specific color detection module 1422a informs the sharpening process control module 1423 of the result of detecting the specific color area (e.g., position information on the specific color area). On the basis of the result of detecting the specific color area, the sharpening process control module 1423 generates a sharpening process control signal for moderating or disabling the sharpening process for the specific color area.

The sharpening process control module 1423 informs the sharpening process module 1421 of the sharpening process control signal. On the basis of the sharpening process control signal, the sharpening process module 1421 moderates or disables the sharpening process for the specific color area, while subjecting the area excluding the specific color area to the sharpening process without moderating the process.

For example, the video processing apparatus 1 can accept the level setting of the sharpening process by the user. In this case, the sharpening process module 1421 sets the level of the sharpening process for the specific color area lower than a preset level or disables the sharpening process for the specific color area, while subjecting the area excluding the specific color area to the sharpening process at the preset level. Setting the level of the sharpening process for the specific color area lower than the preset level is setting a parameter for the sharpening process to the extent that the video signal is not adversely affected.

With this setting, the video processing apparatus 1 controls (or suppresses) the sharpening control for an arbitrary color part, thereby enabling an image of a person's face or the like to be displayed naturally without emphasizing the edge of the image of a person's face or the like and further enabling the images excluding the person's face to be displayed with their edges emphasized.

Figure 5:
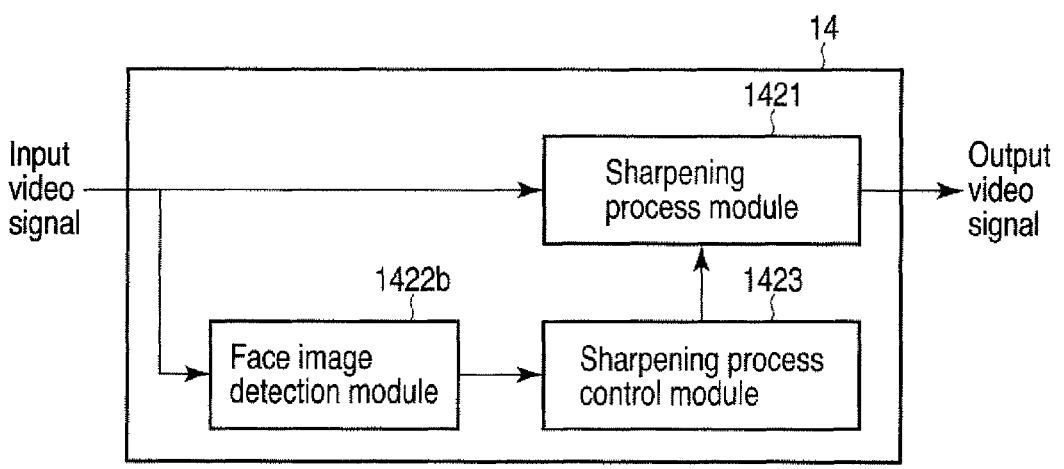
FIG. 5 is a block diagram to realize face image detection and sharpening process control according to the embodiment.

Next, another example of sharpening process control will be explained with reference to FIG. 5. The video processing module 14 may be configured as shown in FIG. 5. Specifically, the video processing module 14 includes a sharpening process module 1421, a face image detection module 1422b, and a sharpening process control module 1423. The video processing module 14 is so configured that an input video signal from the outside (or another video processing unit) is input to the sharpening process module 1421 and face image detection module 1422b.

When the input video signal has been input to the sharpening process module 1421 and face image detection module 1422b, the face image detection module 1422b detects a face image area included in the input video signal. When the face image area has been detected, the face image detection module 1422b informs the sharpening process control module 1423 of the result of detecting the face image area (e.g., position information on the face image area). On the basis of the result of detecting the face image area, the sharpening process control module 1423 generates a sharpening process control signal for moderating or disabling the sharpening process for the face image area.

The sharpening process control module 1423 informs the sharpening process module 1421 of the sharpening process control signal. On the basis of the sharpening process control signal, the sharpening process module 1421 moderates or disables the sharpening process for the image face area, while subjecting the area excluding the face image area to the sharpening process without moderating the process.

With this configuration, the video processing apparatus 1 controls (or suppresses) the sharpening process for a face image part, thereby enabling an image of a person's face or the like to be displayed naturally without emphasizing the edge of the image of a person's face or the like more than necessary and further enabling the images excluding the person's face or the like to be displayed with their edges emphasized.

While control of the super-resolution process has been explained with reference to FIGS. 2 and 3 and control of the sharpening process has been explained with reference to FIGS. 4 and 5, both of the super-resolution process and sharpening process may be controlled. Specifically, the video processing module 14 moderates or disables the super-resolution process and sharpening process for the specific color area on the assumption that the module 14 subjects the input video signal to the super-resolution process and sharpening process, while subjecting the area excluding the specific color area to the super-resolution process and sharpening process without moderating the processes. Alternatively, the video processing module 14 moderates or disables the super-resolution process and sharpening process for the face image area, while subjecting the area excluding the face image area to the super-resolution process and sharpening process without moderating the processes.

The various modules of the device described herein can be implemented as software applications, hardware and/or software modules, or components on one or more computers, such as servers. While the various modules are illustrated separately, they may share some or all of the same underlying logic or code.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An image processing apparatus comprising:
a detector or detection unit configured to detect a flesh-colored area included in first image data;
an image processing controller or an image processing control unit configured to generate an image processing control signal for controlling an image process for the flesh-colored area among image processes including a sharpening process for the first image data; and
an image processor or an image processing unit configured to subject the first image data to the image process on the basis of the image processing control signal,
wherein the sharpening process includes a super-resolution process of creating second image data of a second resolution higher than a first resolution from the first image data of the first resolution, and a sharpness process of emphasizing an edge of an image included in the second image data, and
the image processing controller or the image processing control unit is configured to generate the image processing control signal for setting levels of the super-resolution process and the sharpness process for the flesh-colored area and levels of the super-resolution process and the sharpness process for an area excluding the flesh-colored area at different levels.

2. The image processing apparatus of claim 1, wherein the image processing controller or the image processing control unit is configured to set a gain of the sharpening process including the super-resolution process for the flesh-colored area lower than a gain of the sharpening process including the super-resolution process for the area excluding the flesh-colored area.

3. The image processing apparatus of claim 1, wherein the image processing controller or the image processing control unit is configured to generate the image processing control signal for setting a second level of the super-resolution process for the flesh-colored area to be lower than a first level, and setting the first level of the super-resolution process for the area excluding the flesh-colored area.

4. The image processing apparatus of claim 3, wherein the image processing controller or the image processing control unit is configured to set a gain of the sharpening process including the super-resolution process for the flesh-colored area lower than a gain of the sharpening process including the super-resolution process for the area excluding the flesh-colored area.

5. The image processing apparatus of claim 1, wherein the image processing controller or the image processing control unit is configured to generate the image processing control signal for setting a second level of the sharpness process for the flesh-colored area to be lower than a first level, and setting the first level of the sharpness process for the area excluding the flesh-colored area.

6. An image processing method for detecting a flesh-colored area included in first image data, generating an image processing control signal for controlling an image process for the flesh-colored area among image processes including a sharpening process for the first image data, and subjecting the first image data to the image process on the basis of the image processing control signal, and the sharpening process including a super-resolution process of creating second image data of a second resolution higher than a first resolution from the first image data of the first resolution, and a sharpness process of emphasizing an edge of an image included in the second image data, the method comprising:
generating the image processing control signal for setting levels of the super-resolution process and the sharpness process for the flesh-colored area and levels of the super-resolution process and the sharpness process for an area excluding the flesh-colored area at different levels.

7. The image processing method of claim 6, wherein further comprising setting a gain of the sharpening process including the super-resolution process for the flesh-colored area to be lower than a gain of the sharpening process including the super-resolution process for the area excluding the flesh-colored area.

* * * * *